Oct. 13, 1970 — M. W. NEWBERRY — 3,533,645
CLOSE TRACKING TRAILER VEHICLE
Filed Oct. 21, 1968 — 2 Sheets-Sheet 1
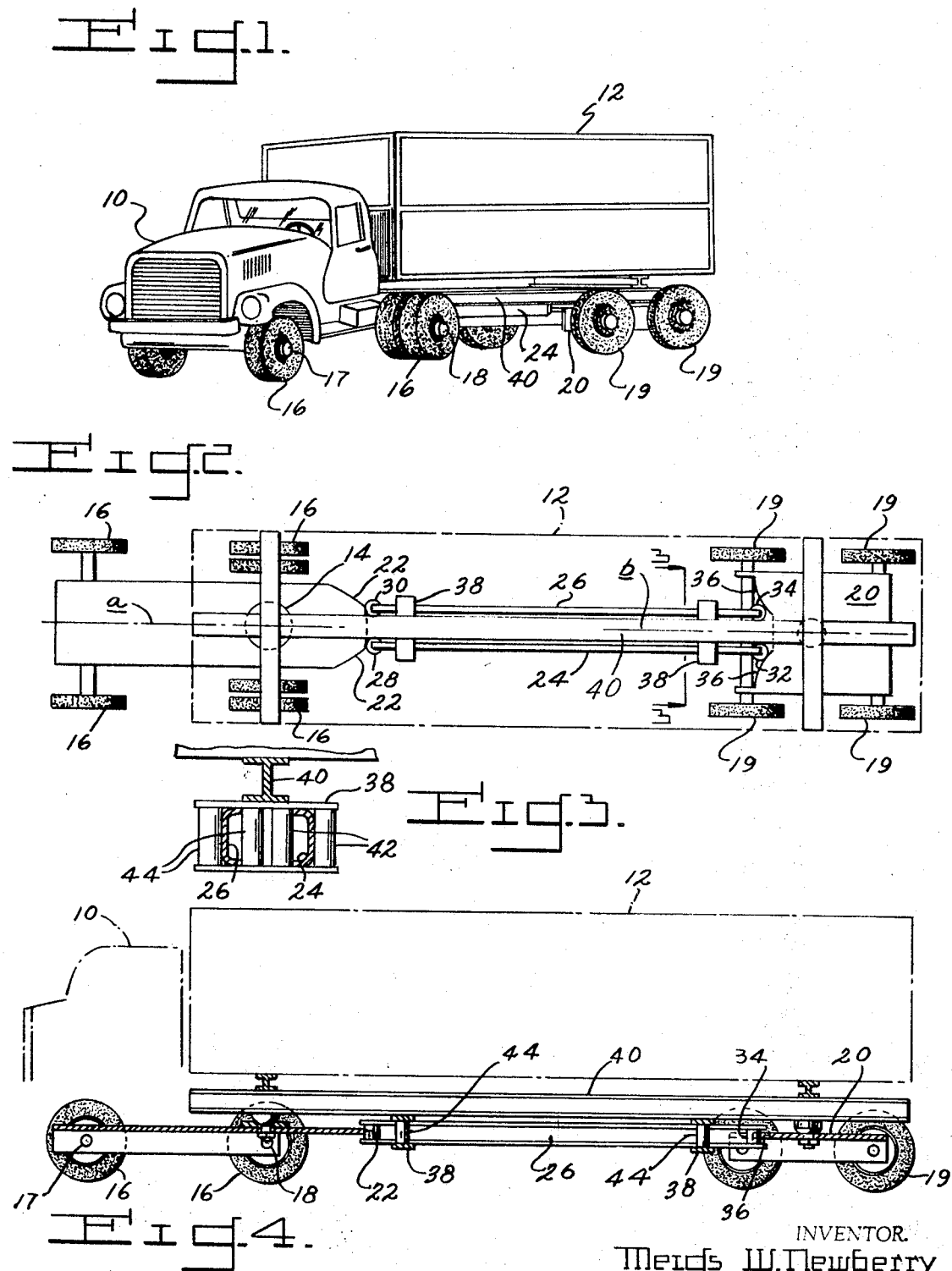
INVENTOR.
Meigs W. Newberry
BY Chapin, Neal & Dempsey
Attorneys

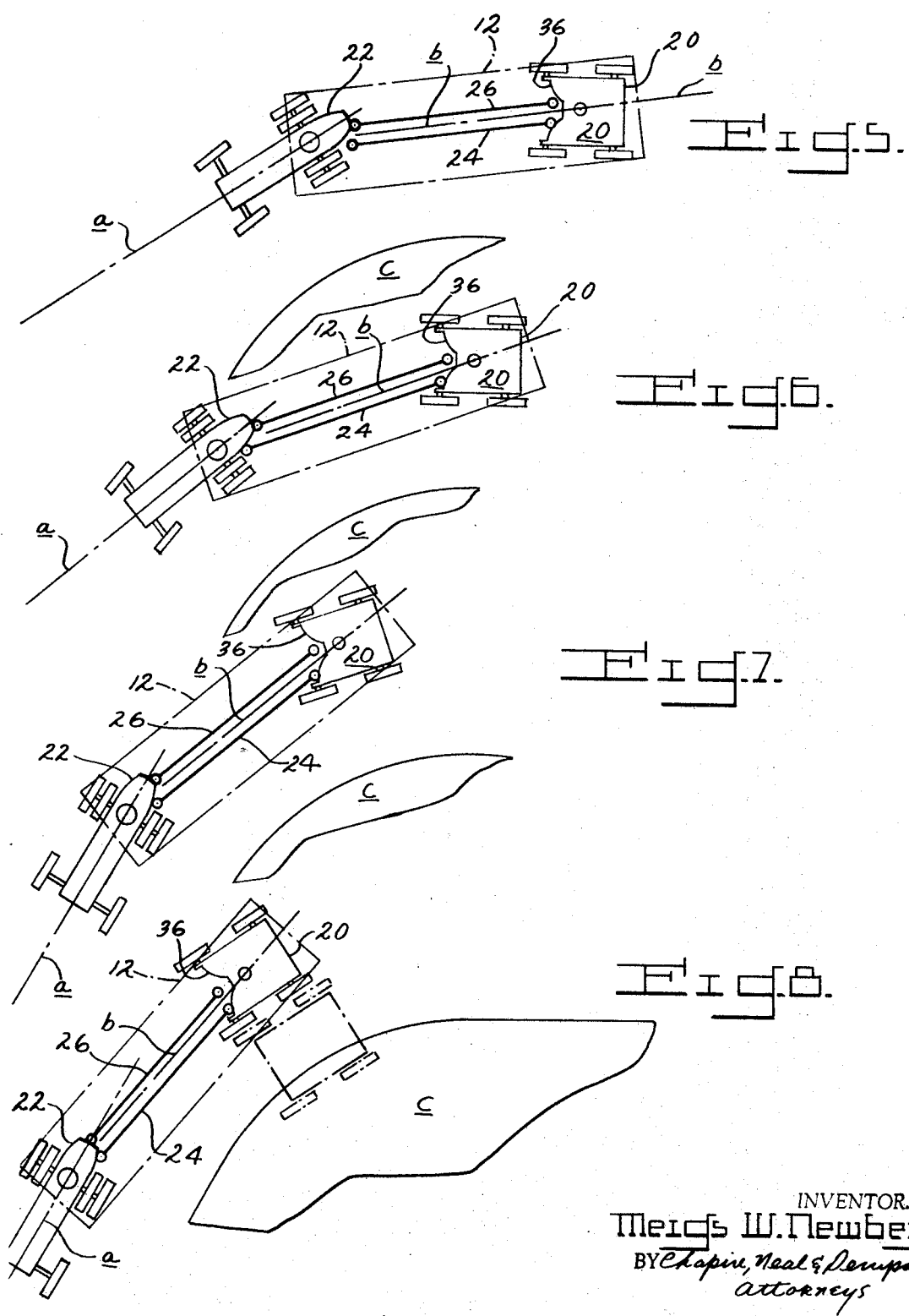

United States Patent Office 3,533,645
Patented Oct. 13, 1970

3,533,645
CLOSE TRACKING TRAILER VEHICLE
Meigs W. Newberry, 630 Parker St.,
East Longmeadow, Mass. 01028
Filed Oct. 21, 1968, Ser. No. 769,237
Int. Cl. B62d 53/00
U.S. Cl. 280—426                5 Claims

ABSTRACT OF THE DISCLOSURE

A tractor and pivotably interconnected trailer having a wheel platform freely rotatable horizontally relative to the body of the trailer. A cam surface carried by the tractor and another cam surface pivotable with the wheel platform. Cam follower rods extending from one to the other of the cam surfaces and interengageable therewith for limiting the degree of angular rotation of the trailer wheel platform when the tractor is hauling the trailer around a curve.

BACKGROUND

As is well known, conventional highway tractor-trailer units consist of a truck-tractor frequently known as the "cab" with a swivel or so-called "fifth wheel" engaged with the "fifth wheel" of the trailer. The wheels of the trailer unit are mounted on fixed axles near the rear of the trailer and usually consist of two or more wheels. In turning a corner the rear wheels of the trailer unit follow inside of the curved path taken by the pulling tractor. This means that when such a tractor-drawn trailer is negotiating a sharp corner, the driver must make a very wide swing with the tractor in order to insure that the rear of the trailer will not cut across the corner and thereby side swipe any vehicle standing or parked inside the tractor's path of travel. Most drivers have observed large trailer trucks taking such a wide swing around a corner and have likely, on occasion, been given cause for concern that their own vehicle would be struck either by the tractor swinging wide of the center of the road or by the trailer cutting across the center of the road. Because of these turning difficulties, many states do not permit more than a single trailer unit to be hauled by a tractor, although in the trucking business the use of two trailers connected in tandem is considered highly desirable for transporting cargo.

The principal object of this invention is to provide means for coupling the movement of a hauling tractor to a trailer vehicle so that the trailer will follow very closely the curved path taken by the tractor when driving around a curve or corner.

It is another object of this invention to provide apparatus for interconnecting tractor and drawn vehicles of the above type which is simple in its construction but effective in operation, and which lends itself to economical manufacture and installation.

The above and other objects and advantages of this invention will be more readily apparent from the following description and with reference to the accompanying drawings, in which:

FIG. 1 is a perspective view of the tractor-trailer truck embodying the control system of this invention;

FIG. 2 is a plan view of the control system of FIG. 1;

FIG. 3 is a section along line 3—3 of FIG. 2;

FIG. 4 is a side elevational view with parts in section to show the construction and operation of the tractor and trailer of this invention; and FIGS. 5 through 8 are diagrammatical views showing progressive operative relationships of the tractor and trailer negotiating a turn.

Referring in detail to the drawings, in FIG. 1 is shown one type of tractor-truck 10 and trailer 12 to which this invention is applicable. The trailer is pivotably coupled to the "fifth wheel" 14 of the tractor which may be of any conventional type. As is customary the front and rear wheels 16 of the tractor are mounted on separate axles 17 and 18 in generally the same manner as an automobile. The rear wheels are therefore on fixed axle 18, while the front wheels are mounted for turning by the steering wheel of the vehicle in conventional fashion. The wheels 19 of the trailer are mounted on axles which are carried by platform 20, pivotable relative to the trailer body in the manner of a dolly. Instead of a tractor trailer this device could be used with a vehicle mounted on two pivotable dollies, not shown, one at the forward end and one at the rear end of the vehicle. Each dolly would have a plurality of wheels similar in mounting to the dolly 20. With this arrangement, turning would be initiated by rotating the forward dolly about its pivot. In a sense the forward dolly corresponds to the tractor 10, except that in steering the vehicle the forward dolly is turned instead of the steering wheels on axle 17. Thus for purposes of this application, a tractor may either be a separable power unit, as shown in FIG. 1, or a pivotable dolly at the forward end of an inarticulated vehicle having a single longitudinal axis, such as a bus.

A cam surface 22 is carried by the cab or tractor and is disposed in fixed angular relationship relative to the longitudinal axis $a$ of the cab. Thus as the cab is turned, as shown in FIGS. 5-8, the cam surface 22 will turn through the same angle. As shown, the cam 22 is generally parabolic in configuration but with an arcuate central or dwell portion which has its center located at the "fifth wheel" 14. The dwell portion extends generally transversely of the cab axis $a$ and sharply receding side portions extend generally at an oblique angle of about 30° from the axis $a$. The width of the dwell portion of cam surface 22 is shown to be approximately equal to the lateral spacing between a pair of independently movable sensing means or cam followers 24 and 26. The cam followers comprise longitudinally movable rods with rollers 28 and 30 on one end contiguous with the cam surface 22 and on the other end rollers 32 and 34 adjacent a second cam surface 36 to be hereinafter described.

The cam followers or sensing means are in the form of beams or rods supported on the underside of the trailer by brackets 38. The brackets, in this embodiment, are fixed to the underside of a beam member 40 and include vertically disposed pairs of rollers 42 and 44 between which the rods or beams 24 and 26 are guided in their longitudinal movement.

The cam surface 36 is carried by the platform or dolly 20 and in the embodiment shown, the forward surface of the dolly is in the form of the cam 36. The cam has a central or dwell portion approximately the same width as the dwell portion of cam 22 and two lobe portions which extended outwardly of the central section at an angle of about 60° relative to the longitudinal axis $b$ of the trailer.

The difference between the angle of projection of the lobes of cam 36 and recesses of the side surface of cam 22 permits a substantial degree of angular rotation of the dolly 20 relative to the trailer axis $b$ before its rotation is arrested as will hereafter be more full described. Of course, by varying the angle of projection of lobes 36 relative to the angle of the side surface of cam 22, the extent of this rotation of dolly 20 can be predetermined at any desired value.

The rods of cam followers 24 and 26 are of sufficient length to extend from positions adjacent the dwell surfaces of the two cams 22 and 36, as best shown in FIG. 2. The rods or cam followers are movable longitudinally with sufficient freedom so as to transmit the longitudinal component of rotation of cam 22. In the initial stages of a turn, the cam 22 may be considered as exercising a limiting function on the rotation of dolly 20 and in the terminal stages, cam 22 may be considered a driving cam to realign the dolly wheels with the trailer body.

OPERATION

The operation of this invention may best be understood by reference to FIG. 2 in which the cab and trailer are shown in the orientation of straight line travel. In this condition, it will be observed that the axes $a$ of the cab and $b$ of the trailer are in alignment, and correspond to the axes of symmetry of the cams 22 and 36. Similarly, the cam follower rods are located in neutral positions and the rollers of each are located opposite the central or dwell portions of the cams.

Referring now to FIG. 5, it will be seen that the cab 10 has commenced to turn about a corner, designated $c$. It will be observed that the cam 22 has turned a substantial angle relative to the axis of the trailer. At this time, the wheels of the dolly or wheel platform 20 of the trailer are continuing along a straight line path on the ground and thus there is relative rotation of the trailer body and dolly. The cam follower rod 24, inboard of the turn, is at this time spaced from the surfaces of the cams 22 and 36 so as to have no affect on this angular rotation of the dolly relative to the trailer. Should the dolly 20 attempt to swing counterclockwise relative to the trailer axis, the other rod 26 is disposed between the arcuate surface of cam 22 and cam 36 so as to restrict, at this stage, such undesirable rotation of dolly 20 in the direction of the turn. As a result, the trailer follows along the curved path taken by the tractor. Relative rotation of the dolly and trailer continues until the position shown in FIG. 6, when the ends of the rod 24 come into engagement with the opposed surfaces of cams 22 and 36. When this occurs, any further angular rotation of the wheel platform 20 relative to the trailer body 12 is arrested since cam 22 acts as a limiting means to any further rotation. At this time, with the cam arrangement described, the dolly has rotated substantially out of alignment with the trailer axis. The amount of rotation of the dolly relative to the trailer axis, before its rotation is arrested, depends upon the sharpness of the turn of the cab or front end dolly, as would be used where this invention is applied to an inarticulated vehicle, such as a bus. As the turn continues, the tendency of the platform to turn further outwardly keeps the rod 24 in compression between the two cam surfaces. As a result, the wheels 19 of the trailer follow the track very closely along the path taken by the wheels of the cab 10. As in driving any conventional vehicle, when the turn has proceeded to a predetermined angle, the cab is "straightened out" preparatory to ending the turn along a desired straight-line path of departure. As this is done, as shown in FIG. 8, the cam surface 22 is rotated clockwise, its component of longitudinal motion cams the rod 24 rearwardly so as to rotate in a counterclockwise direction the trailer wheel platform 20. Functioning in this way cam 22 acts as a driving cam. The final position of the dolly will, of course, be that shown in FIG. 2, heading in a different direction. During a left hand turn, as shown in the drawings, only the cam follower rod 24 is effective, while in a right hand turn only rod 26 is effective. It will be realized that a power assist may be employed in returning the dolly to its centerline position. For example, power may be used to aid the longitudinal movement of the cam follower rods for this purpose.

In summary, the operation of the device is to permit the wheels of the trailer to continue to move along a straight-line path during which time there is an angular rotation of the dolly 20 relative to the trailer body. Actually the trailer body turns relative to the dolly which, as previously described, will in any turn initially continue along its path of entry to the curve. After a predetermined extent of turn of the cab, which is detected or sensed by one of the cam followers, depending on the direction of the turn, any further relative rotation of the trailer and dolly is prevented. In this way the trailer swings about a corner along a curve very close to the path taken by the cab. In FIG. 8 is shown in phantom the path the trailer will follow in a conventional truck-trailer combination where the wheels of the trailer are fixed. It can be seen that the trailer cuts very sharply inside the path followed by the trailer equipped with my invention.

In backing down, or in reverse operation, the turn resistance of the rear dolly is such that it is held in parallel relationship with the trailer body and acts in the same manner as a conventional tractor-trailer combination.

While one mechanical system is shown for controlling the rotation of the dolly, it will be apparent to those skilled in the art that various other cam arrangements may also be used. For example, the cam surfaces may be reversed, that is, arranged to face outwardly with the cam follower rods in tension rather than compression as herein disclosed. Also, hydraulic, electrical or electromechanical systems could be used wherein rotation of the cab would be detected and an electric or hydraulic signal transmitted to limit rotation of the dolly and to realign it with the trailer in response to cab movement.

While for purposes of illustration only one trailer is shown and described, it will be readily appreciated that a plurality of trailers can be connected in the same manner utilizing the basic concept of this invention.

Having thus described the invention, what is claimed is:

1. Turn control system for a motor driven tractor and trailer combination in which the trailer is pivotably coupled to the tractor, said system comprising wheel support means disposed adjacent the after-end of said trailer and horizontally pivotable in relation to the trailer so that in the initial portion of a turn, the wheels of the trailer continue initially in the pre-turn direction of travel of the trailer and independently thereof, means for sensing, during a turn, the angular displacement of the tractor from axial alignment with the trailer, and means responsive to said sensing means for arresting the pivotable movement of said wheel support means relative to the trailer after a predetermined amount of turn of the tractor and for realigning said wheel support with the trailer during the terminal portion of the turn.

2. Turning control system for motor driven tractor and trailer in which the trailer is pivotally coupled to the tractor, said system comprising a dolly disposed adjacent the after-end of said trailer and horizontally pivotable in relation to the trailer so that in the initial portion of a turn, the wheels of the trailer continue initially in the pre-turn direction of travel of the trailer and independently thereof, a first cam surface carried by the tractor, a second cam surface carried by said dolly and cam follower means disposed to engage the first cam surface and thereby limit the extent of angular movement of the dolly relative to the trailer after a predetermined amount of turn of the tractor and to realign the dolly with the trailer duing the terminal portion of the turn.

3. Turn control system for a motor driven tractor and trailer combination in which the trailer is pivotably coupled with the trailer, said system comprising a dolly disposed adjacent the after-end of said trailer and horizontally pivotable relative to the trailer's longitudinal axis so that upon entering a turn in the pre-turn direction of the trailer, the dolly will continue independently of the trailer, a first cam carried by the tractor and having an axis of symmetry corresponding to the longitudinal axis of the tractor, a second cam carried by the dolly and having an axis of symmetry corresponding to the longitudinal axis of the tractor and trailer when they are traveling along a straight line, a pair of cam follower rods laterally spaced and longitudinally movable, the opposite ends of said rods disposed adjacent the first and second cam surfaces to arrest, in response to angular displacement of the first cam from alignment with the trailer axis, pivotable movement of the dolly with respect to the trailer after a predetermined amount of turn and to cause realignment of the dolly with the trailer during the terminal portion of the turn.

4. Turn control system for motor driven tractor and trailer combination as set forth in claim 3 in which the first cam has a generally arcuate central portion with the center thereof at the pivotable connection of the tractor and trailer and having a width approximately equal to the lateral spacing of the follower rods, said first cam also having side portions extending at one oblique angle relative to the longitudinal axis of the tractor, said second cam having a central portion of approximately the same width as the first cam and side lobes extending at an oblique angle relative to the longitudinal axis of the trailer substantially different from said one oblique angle whereby the dolly is free to rotate relative to the trailer axis a substantial angle before being arrested by one of said rods.

5. A turn control system for a vehicle comprising one pivotable wheel support means disposed adjacent the forward end of said vehicle, and another pivotable wheel support means disposed adjacent the after end of said vehicle, means for turning one pivotable wheel support means at the forward end of said vehicle, the wheels at the after end of said vehicle being free to continue initially in the predirection turn of travel of the vehicle and independently thereof, means for sensing during a turn the angular displacement of said one wheel support means from axial alignment with the vehicle, means responsive to said sensing means for arresting the pivotable movement of the other wheel support means after a predetermined amount of turn of the vehicle and for realigning the wheel support means at the after end of the trailer during the terminal portion of the turn.

References Cited

UNITED STATES PATENTS

| 2,325,609 | 8/1943 | Johnson | 280—102 |
| 2,764,424 | 9/1956 | Standing | 280—426 |
| 2,974,978 | 3/1961 | Isachsen | 280—444 |
| 3,156,487 | 11/1964 | Bigge | 280—426 |
| 3,212,793 | 10/1965 | Pietroroia | 280—443 |

FOREIGN PATENTS 396,652  1/1966  Switzerland.

LEO FRIAGLIA, Primary Examiner